United States Patent

McGorrin

(10) Patent No.: US 7,632,344 B2
(45) Date of Patent: Dec. 15, 2009

(54) INK-JET INK FORMULATIONS CONTAINING IMIDAZOLE

(75) Inventor: Marlene McGorrin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 344 days.

(21) Appl. No.: 11/669,889

(22) Filed: Jan. 31, 2007

(65) Prior Publication Data

US 2008/0178766 A1    Jul. 31, 2008

(51) Int. Cl.
*C09D 11/00* (2006.01)
*C09D 11/02* (2006.01)

(52) U.S. Cl. ............... 106/31.49; 106/31.58; 106/31.48; 106/31.47

(58) Field of Classification Search ............... 106/31.49, 106/31.58, 31.48, 31.47; 428/195.1
See application file for complete search history.

(56) References Cited

U.S. PATENT DOCUMENTS

| | | | |
|---|---|---|---|
| 5,223,026 A | 6/1993 | Schwarz, Jr. | |
| 5,428,383 A | 6/1995 | Shields et al. | |
| 5,536,306 A * | 7/1996 | Johnson et al. | 106/31.49 |
| 5,766,325 A | 6/1998 | Gundlach et al. | |
| 5,810,916 A | 9/1998 | Gundlach et al. | |
| 5,855,656 A * | 1/1999 | Gundlach et al. | 106/31.43 |
| 5,858,075 A | 1/1999 | Deardurff et al. | |
| 5,958,121 A | 9/1999 | Lin | |
| 6,048,388 A * | 4/2000 | Schwarz | 106/31.27 |
| 6,379,441 B1 | 4/2002 | Kanaya et al. | |
| 6,383,275 B1 | 5/2002 | Lin | |
| 6,436,180 B1 | 8/2002 | Ma et al. | |
| 6,818,048 B2 | 11/2004 | Prasad et al. | |
| 6,890,378 B2 | 5/2005 | Yatake et al. | |
| 7,476,270 B2 * | 1/2009 | McGorrin | 106/31.47 |
| 7,479,178 B2 * | 1/2009 | Dodge et al. | 106/31.47 |
| 7,481,875 B2 * | 1/2009 | Deardurff | 106/31.48 |
| 2002/0112643 A1 | 8/2002 | Tyvoll et al. | |
| 2003/0107632 A1 | 6/2003 | Arita et al. | |
| 2005/0183628 A1* | 8/2005 | Lehmann et al. | 106/31.49 |
| 2006/0111467 A1 | 5/2006 | Reinhardt et al. | |
| 2006/0139426 A1* | 6/2006 | Doi | 106/31.49 |
| 2006/0164483 A1 | 7/2006 | Yabuki et al. | |
| 2006/0192819 A1* | 8/2006 | Doi | 347/85 |
| 2007/0091156 A1* | 4/2007 | Jackson | 106/31.49 |
| 2008/0178764 A1* | 7/2008 | Deardurff | 106/31.47 |
| 2008/0178765 A1* | 7/2008 | McGorrin | 106/31.45 |

* cited by examiner

*Primary Examiner*—Helene Klemanski

(57) ABSTRACT

An ink for use in combination with an ink-jet printer comprises a mixture including a colorant, a liquid vehicle comprising 1,6-hexanediol and 1,5-pentanediol in a ratio in the range of 1:4 (wt/wt) to 4:1 (wt/wt), and/or an amount of imidazole in the range of 0.1 wt % to 6 wt %, and potentially provides at least one of the following enhancements to the ink improved print quality, increased decap time, pen reliability, environmental robustness of ink in pen, environmental robustness of printed ink on media, and aid in maintaining the pH of the ink in a desired range.

26 Claims, 2 Drawing Sheets

INK-JET INK FORMULATIONS CONTAINING IMIDAZOLE

BACKGROUND

In ink-jet technology, image quality of high-resolution images can be a function of both the ink-jet ink used to produce an image and the print medium upon which the image is printed. In ink-jet printing, droplets of ink are ejected from a printhead in response to electrical signals generated by a microprocessor and are deposited on a print medium, such as paper or polymeric substrates, to form the desired image.

The use of digital image-forming apparatus such as, for example, thermal ink-jet printers, large-format plotters, piezo-electric printers, large form plotters, laser printers, silver halide grade photo imaging apparatus, and others has grown in recent years. The growth may be attributed to substantial improvements in print resolution and overall print quality coupled with appreciable reduction in cost, and ease of use. Today's image-forming apparatus offer acceptable print quality for many commercial, business and household applications at costs lower than those offered in the past.

Perceived color quality can be characterized using any one of several color space systems, such as CIELAB or Munsell, as is well known in the art. With respect to Munsell color space, a given color is defined using three terms, namely Hue, Value, and Chroma. With respect to CIELAB color space, a color is defined using three terms L*, a*, and b*. With this system, L* defines the lightness of a color, and it ranges from 0 to 100 (with 100 being white). Additionally, the terms a* and b*, together, define the hue, where a* ranges from a negative number (green) to a positive number (red), and b* ranges from a negative number (blue) to a positive number (yellow). Additional terms such as h* (hue angle) and C* (chroma) are used to further describe a given color, as is known to those skilled in the art.

In general, a successful ink for color ink-jet printing must have the following properties: good crusting resistance, good stability, the proper viscosity, the proper surface tension, good color-to-color bleed alleviation, rapid dry time, no negative reaction with the vehicle, consumer-safety, and low strike-through. When placed into a thermal ink-jet system, the ink set must also be kogation-resistant. However, a single ink-jet colorant and/or ink, which has good chroma, gamut, hue angle, and environmental robustness (e.g., air-fastness, light-fastness, water-fastness) is not always optimal for use with other colorants and/or ingredients of that ink, or other inks with which it is used in combination. In other words, not only does an individual colorant and/or ink (e.g., cyan, magenta, or yellow ink), have to independently have acceptable color qualities, but it should also work well when used as part of a dye and/or ink set. Accordingly, it would be desirable to provide colorant and inks for use in ink-jet printing, which have improved print quality, reliability performance, and environmental robustness, when used individually as well as in combination with other dyes and inks.

When a high-resolution image is printed, major issues arise, namely, color quality and image permanence, i.e., how long the quality of the image will last. With respect to much of the print media currently on the market, printed images commonly exhibit undesirable characteristics relating to image permanence. One such undesirable characteristic is the gradual dye-fade that is sometimes observed when dye-based ink-jet inks are printed on porous media. Such fade is caused by air and, more particularly, by small amounts of ozone in the air. It appears that, over time, ozone reacts with many dyes commonly used in ink-jet inks, causing them to break down and to lose or diminish their intended color properties. It has been observed that when ozone reacts with ink-jet ink dyes, the intended color properties of a given dye may shift to another wavelength value along the visible spectrum. This effect causes a gradual change in the perceived colors of the printed image from what was originally intended, i.e., color-shift. For instance, "red shift" is caused by oxidation of cyan dyes. Existing techniques for mitigating red shift include protecting prints from exposure to the atmosphere, such as by displaying them under glass. Dye-fade and colorshift is more of a problem with certain dyes than with others. Cyan dyes tend to be affected to a greater extent by the presence of ozone in the air than do other dyes.

Some of the drawbacks associated with the combination of existing ink-jet inks and print media include bronzing on swellable photo media, haze and humid hue shift on porous photo media, and bleeding of colors, among others. "Bronzing" refers to a lustrous sheen that appears on a printed sample in reflected light, typically appearing as reddish-brown color. It tends to be associated with cyan dyes. One way to mitigate bronzing has been to raise the pH of the ink. Increasing the pH of the ink has its own drawbacks, as the resulting ink may degrade the printhead. Other chemical reactions which detract from the desired color quality can take place in the ink composition during storage. An ink-jet ink composition should be stable and capable of producing the desired color after several months in storage, and for some period of time after first use and exposure to air. Porous photo media problems that occur include: haze and humid hue shift on porous photo media, and bleeding of colors, among others.

"Humid hue shift" refers to the tendency of the ink and/or the colorant(s) present in the ink to migrate or spread undesirably into unprinted or printed adjacent areas of the media substrate. Humid hue shift typically occurs prior to the printed inks fully drying on a substrate or after the inks are printed when exposed to humid conditions. "Print quality" generally refers to the level of defects including, but not limited to, such as bronzing, humid hue shift and/or bleed of ink-jet printed marks, particularly with colored inks.

Various buffering agents or pH adjusting agents are often used in ink-jet ink compositions, as even a slight change of pH can cause some colorants (e.g., dyes) to precipitate. Typical buffering agents include such pH control solutions as Trizma Base, available from Sigma-Aldrich Corp. (Milwaukee, Wis.); 4-morpholine ethane sulfonic acid ("MES"); 4-morpholinepropanesulfonic acid ("MOPS"); and beta-hydroxy-4-morpholinepropane-sulfonic acid ("MOPSO"); hydroxides of alkali metals and amines, such as lithium hydroxide, sodium hydroxide, potassium hydroxide; citric acid, nitric acid, hydrochloric acid, acetic acid, sulfuric acid; amines such as triethanolamine, diethanolamine, and dimethyl-ethanolamine; and other basic or acidic components. If used, buffering agents, typically comprise up to about 10 wt % of the ink-jet ink composition.

Various salts are often used in ink-jet ink compositions, to control bleed, especially for printing on plain paper media. The presence of salts can cause some colorants (e.g., dyes) to precipitate. Some of the drawbacks associated with the combined use of salts in ink-jet inks and print media include: bronzing on swellable photo media, haze and humid hue shift on porous photo media, among others. Some of the drawbacks associated with the combination of salt containing inks and ink-jet pens include: decreased pen reliability, decreased decap time, and decreased environmental robustness of the pen. Typical bleed controlling agents include multivalent salts such as calcium nitrate, calcium chloride, calcium acetate, magnesium nitrate, magnesium chloride, magnesium acetate, and combinations thereof. If used, bleed control agents typically comprise up to about 5 wt % of the ink-jet ink composition.

SUMMARY

An ink for use in combination with an ink-jet printer comprises a mixture comprising a colorant; a liquid vehicle comprising 1,6-hexanediol and 1,5-pentanediol in a ratio in the range of 1:4 (wt/wt) to 4:1 (wt/wt) and/or imidazole in an amount in the range of 0.1 to 6 wt % (by weight of the ink), and potentially provides at least one of the following enhancements to the ink: improved print quality, increased decap time, pen reliability, environmental robustness of ink in pen, environmental robustness of printed ink on media, and aid in maintaining the pH of the ink in a desired range.

BRIEF DESCRIPTION OF THE DRAWINGS

For a detailed description of an exemplary embodiment of the invention, reference will now be made to the accompanying drawings, in which.

NOTATION AND NOMENCLATURE

Figure 1:
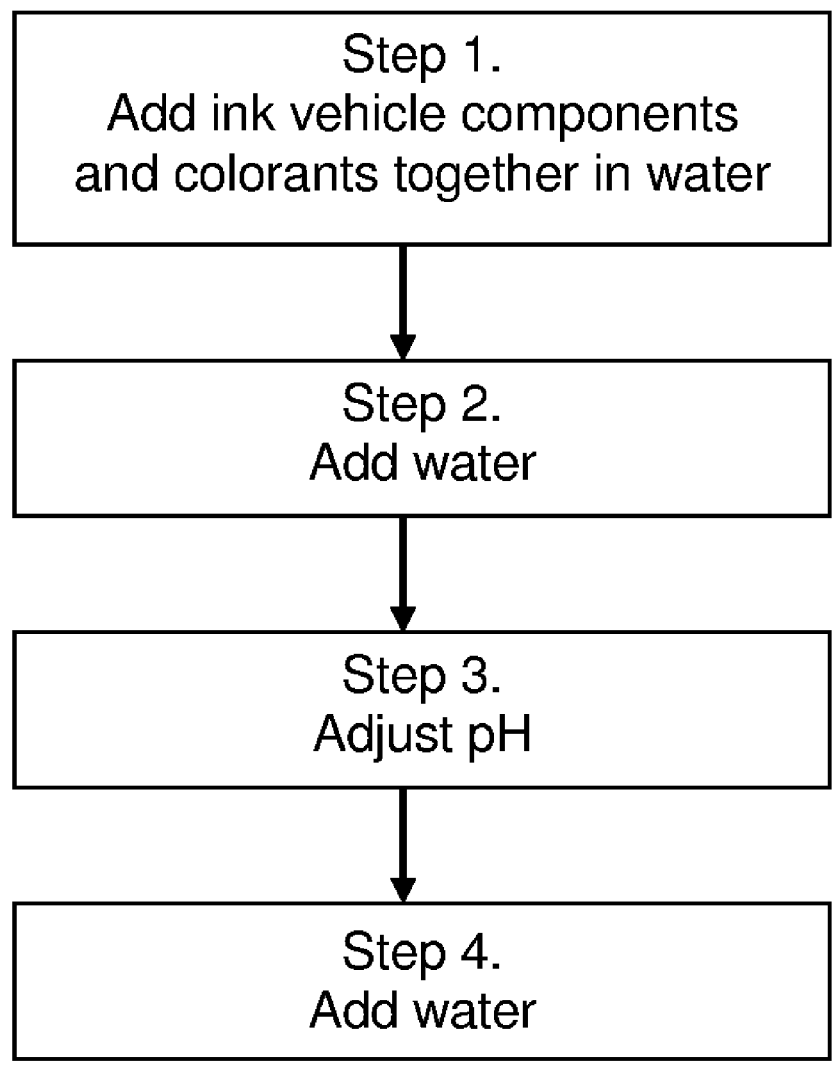
FIG. 1 is a flow diagram showing the process for forming an ink-jet ink composition, in accordance with an embodiment of the present invention.

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "comprising, but not limited to . . . ." Likewise, the singular forms "a," "an," and "the" include plural referents unless the context clearly dictates otherwise. Thus, for example, reference to "a dye" includes reference to one or more of such materials.

An "ink" or "ink-jet ink" refers to a liquid solution or dispersion composition that can comprise a liquid vehicle and a colorant, e.g., a dye, or combination of dyes, or a pigment or combination of pigments, or a dispersed dye or combination of dispersed dyes, or a dye with a pigment or a dispersed dye, or any combination of dyes and/or pigments and/or dispersed dyes. The liquid vehicle can be configured to be stable with the dye through a broad range of solution characteristics, and can be configured for ink-jet printing.

As used herein, "liquid vehicle" is defined to include liquid compositions that can be used to carry colorants to a substrate. Liquid vehicles are well known in the art, and a wide variety of ink vehicles may be used in accordance with various embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as polymers, UV curable materials, and/or plasticizers in some embodiments.

"Media substrate" or "substrate" includes any substrate that can receive ink thereon, and can include papers, overhead projector plastics or films, coated papers such as photobase, fabric, art paper such as water color paper, optical disks, or the like.

"Porous medium" refers to any substantially inorganic particulate-containing coated medium having surface voids and/or cavities capable of absorbing the ink-jet inks in accordance with embodiments of the present invention. Typically, porous media include a substrate and a porous ink-receiving layer. As ink is printed on the porous media, the ink fills the voids and the outermost surface can become dry to the touch more quickly than in the case of traditional or swellable media. Photographs are typically printed on swellable media, which usually has a coating containing inorganic particulates such as metal or semi-metal oxides (e.g., silica or alumina) and polymeric binders, and may include mordants or ionic binding species that attract certain dye species.

The term "about" when referring to a numerical value or range is intended to encompass the values resulting from experimental error that can occur when taking measurements.

Concentrations, amounts, measurements, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. This same principle applies to ranges reciting only one numerical value. For example, a range recited as "less than about 5 wt %" should be interpreted to include all values and sub-ranges between 0 wt % and 5 wt %. Furthermore, such an interpretation should apply regardless of the breadth of the range or the characteristics being described.

It should also be appreciated by those skilled in the art that while concentrations, amounts, and other numerical data may be expressed or presented herein and discussed as a "ratio of ink components" present in an ink formulation, such ratios and ratio ranges are used for convenience and brevity, and thus, should be interpreted in a flexible manner to include not only the numerical values explicitly recited as the limits of the range of ratios, but also to include all the individual numerical values or sub-ranges encompassed within that range as if each numerical value and sub-range is explicitly recited. For example, a range recited as "a ratio between 1:4 and 4: " or "a ratio in the range of 1:4 to 4:1" should be interpreted to include all values and sub-ranges such ratios including 0.20, 0.50, 0.60, 0.70 and 0.80, and every value between 1:4 and 4:1.

DETAILED DESCRIPTION

Ink-jet Ink compositions for use in inkjet printing (e.g., either or both piezoelectric and thermal inkjet apparatus), methods for forming printed images, and printed images are disclosed. The present inks generally include a colorant, a liquid vehicle, imidazole, and/or 1,6-hexanediol and 1,5-pentanediol, and, optionally, other additives. As used herein when the context permits, "imidazole" refers to any form or hydrate of imidazole, including but not limited to cationic or anionic forms of imidazole, and the like. For example, references to "imidazole" encompass imidazole hydrochloride, imidazole hydrobromide, imidazolium sulfate, imidazolium carbonate, potassium imidazolate, sodium imidazolate, and other forms of imidazole.

In some embodiments, imidazole is present in the ink in an amount in the range of about 0.1 wt % to about 6 wt %, by weight of the ink. In some embodiments, the imidazole range is about 0.5 to 2 wt %.

In some embodiments, the 1,6-hexanediol and 1,5-pentanediol are present in the ink in a ratio in the range of 1:4 to 4:1 (wt/wt). In some embodiments, the ratio is in the range of 1:1 (wt/wt) to 3:1 (wt/wt). In some embodiments, the ratio is in the range of 1:4 (wt/wt) to 2:3 (wt/wt). In some embodiments, 1,6-hexanediol and 1,5-pentanediol together comprise about 2 to 35 wt % of the weight of the ink composition. In some embodiments, 1,6-hexanediol and 1,5-pentanediol together comprise about 2 to 15 wt %, and in some other embodiments 1,6-hexanediol and 1,5-pentanediol together comprise about 8 to 25 wt % of the ink composition.

In some embodiments the ink-jet ink contains imidazole and 1,6 hexanediol and 1,5-pentanediol are present in the ink. One exemplary ink comprises 0.1-6.0 wt % imidazole, 0.5-7.0 wt % 1,6 hexanediol, and 2.0-8.0 wt % 1,5 pentanediol, by weight of the ink composition. Another exemplary ink comprises 0.5-2.5 wt % imidazole, 5.0-7.0 wt % 1,6 hexanediol, and 2.0-5.0 wt % 1,5 pentanediol. Still another exemplary ink comprises 0.1-6 wt % imidazole, 5-15 wt % 1,6 hexanediol and 3-8 wt % 1,5 pentanediol. Another exemplary ink comprises 0.1-6 wt % imidazole, 0.5-4.0 wt % 1,6 hexanediol and 2.0-7.0 wt % 1,5 pentanediol.

Various of the ink compositions are suitable for ink-jet printing on a variety of printable media, including swellable media, porous media, coated media, and the like. Many of the new inks are particularly useful for imaging and photo printers, including home and commercial printers. Many of the inks are variously suited for printing on inorganic porous particulate coated media (e.g., silica and/or alumina coated media), polymeric swellable media (e.g., hydrophilic polymer or gelatin coated media), or paper substrates, such as plain paper and uncoated paper. Exemplary print media that can be used includes, but is not limited to, Hewlett-Packard Advanced Glossy™ Photo Paper, Ilford Galerie Pearl™ Photo Ink-jet Paper (semi-gloss), Epson Premium Glossy™ Photo Paper, Pictorico Photo Gallery™ glossy paper, and one or more of a variety of plain papers.

Many formulations of ink described herein significantly reduce bronzing, bleeding, and humid hue shift, improve stacking performance, improve environmental robustness of the ink printed on media, and at the same time aid in maintaining the pH of the ink in a desired range, compared to most ink-jet inks in common use today when used for ink-jet printing of images. Many formulations of ink described herein significantly increase pen reliability, decap time, and environmental robustness of the pen, compared to most ink-jet inks in common use today.

Ink Composition

The ink compositions that can be used in an ink-jet printer to form printed images on print media are typically prepared in an aqueous formulation or liquid vehicle that can include water, colorants, co-solvents, surfactants, buffering agents, bleed control agents, biocides, sequestering agents, viscosity modifiers, humectants, binders, and/or other known additives.

Vehicle.

The liquid vehicle may comprise from about 70 wt % to about 99.9 wt % by weight of the ink composition, for example. Typically, the content of buffering agents other than imidazole in the ink formulations is reduced compared to the composition of many other inks in use today. The desirable buffering property of imidazole is discussed in more detail below.

The vehicle for the ink may comprise an aqueous-based vehicle that includes water or a mixture of water and at least one water-soluble organic solvent. Selection of a suitable mixture depends on requirements of the specific application, such as desired surface tension and viscosity, the selected colorant, drying time of the liquid, and the type of substrate onto which the liquid will be printed. Some water-soluble organic solvents that may be selected for use in the present inks are described in U.S. Pat. No. 5,085,698, the disclosure of which is hereby incorporated by reference.

Co-solvents.

One or more solvent or co-solvents may be included in the ink formulation in a total amount generally ranging from about 1% (wt %) to about 50%; from about 2 to about 45 wt %, or from about 5 to about 35 wt %. Suitable co-solvents include, but are not limited to, water soluble organic co-solvents, aliphatic alcohols, aromatic alcohols, diols, glycol ethers, poly(glycol) ethers, N-alkyl caprolactams, unsubstituted caprolactams, both substituted and unsubstituted formamides, both substituted and unsubstituted acetamides, long chain alcohols, ethylene glycol, propylene glycol, diethylene glycols, triethylene glycols, glycerin, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol)alkyl ethers, and the like. Specific examples of co-solvents that are preferably employed in the practice of this invention include, but are not limited to, 1,6-hexanediol, 1,5-pentanediol, 2-pyrrolidinone, 1,2-(hydroxylethyl)-2-pyrrolidinone, trimethylolpropane (EHPD) and tetraethylene glycol.

Selected co-solvents can be added to reduce or enhance the rate of evaporation of water in the ink-jet to minimize clogging or other properties of the ink such as viscosity, pH, surface tension, optical density, and print quality, as desired. Multiple co-solvents can also be used, as is known in the art. An example of an ink vehicle formulation usable in formulating an ink includes one or more solvent or co-solvent, in a (total) amount in the range of about 1% (wt %) to about 50%; from about 2 to about 45 wt %, or from about 5 to about 35 wt %.

Bleed Control Agents.

In some embodiments, bleed control agents are employed in an amount comprising up to about 5 wt % of the ink-jet ink composition. Some suitable bleed control agents consist of multivalent salts such as calcium nitrate, calcium chloride, calcium acetate, magnesium nitrate, magnesium chloride, magnesium acetate, and combinations of any of those or other salts.

Buffering Agents.

Various buffering agents or pH adjusting agents may also be selected for inclusion in the ink-jet ink compositions.

Typical buffering agents include such pH control solutions as Trizma Base, available from Sigma-Aldrich Corp. (Milwaukee, Wis.); 4-morpholine ethane sulfonic acid ("MES"); 4-morpholinepropanesulfonic acid ("MOPS"); and beta-hydroxy-4-morpholinepropane-sulfonic acid ("MOPSO")); hydroxides of alkali metals and amines, such as lithium hydroxide, sodium hydroxide, potassium hydroxide; citric acid, nitric acid, hydrochloric acid, acetic acid, sulfuric acid; amines such as triethanolamine, diethanolamine, and dimethylethanolamine and other basic or acidic components. If used, buffering agents, typically comprise up to about 10 wt % of the ink-jet ink composition.

Both buffering agents and bleed control agents potentially contribute to bronzing of the ink-jet printed image, reduced decap times, reliability, and environmental robustness for some colorants in inkjet inks. Ink-jet ink printing performance is affected by colorant(s) and ink(s), which, when used individually as well as synergistically and in combination with other colorant(s) and ink(s), have improved print quality, pen reliability performance, and environmental robustness of both ink in pen and printed ink on media. In many embodiments, an optimized formulation approach is employed to reach a target pH for a specific ink, which takes into consideration the colorant(s) and ink formulation components present in that ink as well as the selected colorant(s) and ink formulation components in the other ink(s) to be printed with or adjacent to the subject ink, as well as other considerations (e.g., print media, pen reliability and so forth).

In some ink formulations it is desirable to select a reduced amount of buffering agent that does not substantially interfere with either the bleed control or optical density characteristics of the ink nor the pen reliability, decap time, or environmental robustness. In conventional ink-jet inks, buffering agents typically comprise up to 10 wt % of the ink-jet ink composition. In contrast, most embodiments of the present imidazole buffered compositions contain a reduced amount of other buffering agents, usually in the range of 0 to 2.5 wt %.

Other Additives.

Various types of additives, may be employed in the inks (or the performance optimizing liquid vehicle) to optimize the properties of the ink compositions for specific applications. The remainder of the ink composition is mostly water; however, other independently selected components may be included in some embodiments, including: surfactants, humectants, anti-kogation additives, anti-corrosive additives, polymers, preservatives, biocides that inhibit growth of microorganisms (such as the preservative PROXEL™ GXL available from Avecia Incorporated); chelating agents (or sequestering agents) such as EDTA that eliminate deleterious effects of heavy metal impurities; and viscosity modifiers, which may be added to improve various properties of the ink composition.

In an embodiment, at least one of the inks (e.g., the cyan ink), may further include a phenylenediamine compound having having the CA Index name Ethanesulfonic acid, 2,2'-[1,3-phenylenebis[imino[6-[bis(2-hydroxyethyl)amino]-1,3,5-triazine-4,2-diyl]imino]]bis-, disodium salt. The presence of the phenylenediamine compound acts as an anti-flocculant reducing the unwanted aggregation of the dyes in the ink. In an embodiment, the diphenylamine additive improves the quality of the printed images, in particular on swellable media by reducing coalescence and bronzing of the ink on the printing medium. This phenylenediamine compound is further described in European Patent Publication EP1514913A2. In an embodiment, when present, the phenylenediamine compound may be added to each ink in an amount generally ranging from about 0.2 to about 10%, from about 0.5 to about 5%, from about 1.5 to about 2.5%, by weight, based on the total weight of the ink (with the wt % numbers for the phenylenediamine compound corrected for the % active ingredients).

Surfactants. One or more surfactants can be included in an ink formulation, such suitable alkyl polyethylene oxides, alkyl phenyl polyethylene oxides, polyethylene oxide block copolymers, acetylenic polyethylene oxides, polyethylene oxide(di)esters, polyethylene oxide amines, protonated polyethylene oxide amines, protonated polyethylene oxide amides, dimethicone copolyols, substituted amine oxides, and the like, as well as fluorocarbon surfactants such as those formed at least in part from a polymer made based on oxetane chemistry having the structure

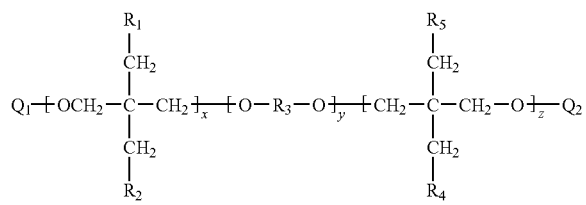

Wherein $Q_1$ and $Q_2$ are independently selected from the group consisting of H, $SO_3^-W^+$, $COO^-W^+$, and COOH and wherein W is selected from the group consisting of $NH_4$, Li, Na, and K;

$R_1$ and $R_2$, are independently selected from the group consisting of H and OH;

$R_4$, and $R_5$ are independently selected from the group consisting of $O(CH_2)_m$—$(CF_2)_n$—$CF_3$ wherein m=1-3 and n=0-3;

$R_3$ is selected from the group consisting of $(CH_2)_L$ and

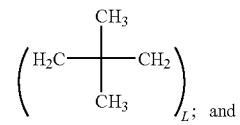

$L = 1\text{-}4; x = 1\text{-}10; y = 1\text{-}30;$ and $z = 1\text{-}10.$

In an embodiment, the oxetane-based fluorocarbon surfactant is formed from at least a polymeric material having L=4; m=1; n=1; and $R_2$ and $R_4$=H.

Examples of suitable oxetane-based fluorocarbon surfactants include, but are not limited to those generally available from companies such as Omnova Solutions, Inc. of Fairlawn, Ohio under the trade name of PolyFox® fluorocarbon surfactants. Exemplary PolyFox® surfactants include PolyFox PF-136A, PolyFox PF-151N, PolyFox PF-154N, and PolyFox PF-156A, PolyFox AT-1121.

Examples of nonionic and amphoteric surfactants include TERGITOL® compounds, which are alkyl polyethylene oxides available from Dow Chemical (Midland, Mich.); TRITON® compounds, which are alkyl phenyl polyethylene oxide surfactants available from Rohm & Haas Co. (Philadelphia, Pa.); BRIJ® compounds available from ICI Americas (Wilmington, Del.); PLURONIC® compounds, which are polyethylene oxide/polypropylene oxide block copolymers; SURFYNOL® compounds, which are acetylenic polyethylene oxides available from Air Products (Allentown, Pa.); anionic surfactants such as members of the DOWFAX™ family of diphenyl sulfonate derivatives available from the Dow Chemical Company, and the CRODAFOS™ family of phosphate esters available from Croda Incorporated;.polyethylene oxide ("POE") esters; POE diesters; POE amines; POE amides; and dimethicone copolyols.

Colorants.

Colorants employed in many of the imidazole-containing ink compositions are dyes, such as are known. With respect to the various ink-jet ink dyes, any suitable cationic dye or anionic dye can be used. One representative anionic dye is a chromophore having a pendent anionic group. Though any effective amount of dye can be used, preferably, the anionic dye is present in the ink composition in an amount in the range of about 0.1 wt % to about 10 wt %.

Examples of suitable anionic dyes that can be used include but are not limited to a large number of water-soluble acid and direct dyes. Specific examples of anionic dyes include: Direct Yellow 86, Direct Yellow 132, Acid Red 249, Direct Blue 199, Direct Black 168, Reactive Black 31, Direct Yellow 157, Reactive Yellow 37, Acid Yellow 23, Reactive Red 180, Acid Red 52, Acid Blue 9, Direct Red 227, Acid Yellow 17, Direct Blue 86, Reactive Red 4, Reactive Red 56, Reactive Red 31, and Direct Yellow 132; Aminyl Brilliant Red F-B (Sumitomo Chemical Co.); the Duasyn line of "salt-free" dyes available from Hoechst; mixtures thereof; and the like. Further examples include Bernacid Red 2BMN, Pontamine Brilliant Bond Blue A, BASF X-34, Pontamine, Food Black 2, Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Pro-Jet 485 (a copper phthalocyanine); Magenta 377; Yellow 1189; mixtures thereof, and the like. This list is intended to be merely exemplary, and should not be considered limiting. Similarly, a large range of cationic dyes can be used.

Alternatively, any other suitable dyes and/or pigments may be employed in the present inks. Imidazole and/or 1,6-hexanediol and 1,5-pentanediol is(are) included in the formulations of the present inks. It has been found that bronzing, bleeding, humid hue shift, hazing, and poor stacking performance, and other drawbacks of many conventional ink-jet inks are potentially reduced by inclusion in the ink of an effective amount of imidazole, (i.e., in the range of about 0.1 wt % to 6 wt %) or of 1,6-hexanediol and 1,5-pentanediol in a ratio in the range of 1:4 to 4:1, or by including a combination of all of those in the ink formulation.

Dyes

Magenta Dyes. An exemplary colorant for use in some of the new inks for use in ink-jet printing includes a first magenta dye and a second magenta dye. The first magenta dye has the structure of Formula 1:

FORMULA 1

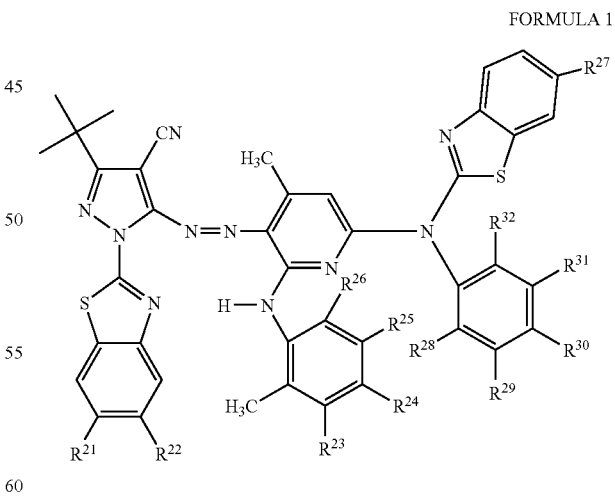

In Formula 1, $R^{21}$, $R^{23}$, $R^{25}$, $R^{27}$, $R^{29}$ and $R^{31}$, are independently a hydrogen atom or a sulfonate group, $R^{22}$ is a hydrogen atom or a nitro group, $R^{26}$ and $R^{28}$ are independently a hydrogen atom or a methyl group, $R^{24}$ and $R^{30}$ are independently a methyl or sulfonate group, and $R^{32}$ is a methyl or a methoxy group.

In one embodiment, in Formula 1, $R^{21}$, $R^{23}$, $R^{27}$, and $R^{31}$ can be sulfonate groups; $R^{22}$, $R^{25}$, and $R^{29}$ can be hydrogen atoms; and $R^{24}$, $R^{26}$, $R^{28}$, $R^{30}$, and $R^{32}$ can be methyl groups. In another embodiment, the sulfonate group can be a salt of lithium, sodium, potassium, ammonium, tetramethylammonium, or a mixture thereof. In still another embodiment, the sulfonate group can be a salt of potassium.

The second magenta dye can have the structure of Formula 2:

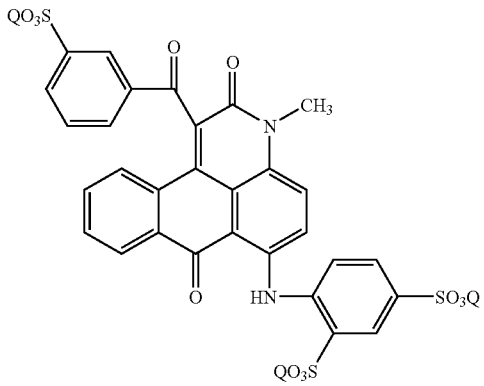

FORMULA 2 and salts thereof, wherein Q is lithium, potassium, sodium, ammonium, tetramethylammonium, or a mixture thereof.

Formula 2 above is shown in acid form, but it is noted that this can also be used in salt form, including but not limited to a salt of sodium or ammonium. In addition to these two types of dyes, other magenta and non-magenta dyes can also be present in the magenta ink-jet ink.

Cyan Dyes. An ink for use in ink-jet printing can comprise one or more cyan, magenta, or yellow ink (colored ink) that includes at least one salt, which, when the colored ink contacts a black ink, causes the black self-dispersed pigment to precipitate, thereby helping to alleviate black to color bleed. The cyan ink that can be used includes a dye with the structure of Formula 3:

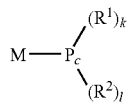

FORMULA 3 where M represents a hydrogen atom or a metal atom (or an oxide, hydroxide, or halide thereof), and $P_c$ represents a phthalocyanine nucleus. $R^1$ and $R^2$ each independently represent a substituent selected from the group of —$SOX^1$, —$SO_2X^1$, $SO_2NX^2X^3$, —$SO_3X^4$, where $X^1$, $X^2$, $X^3$, and $X^4$ each independendently represents a hydrogen atom, a substituted or unsubstituted alkyl group, a substituted or unsubstituted aryl group, or a substituted or unsubstituted heterocyclic group. At least one of $R^1$ or $R^2$ has an ionic hydrophilic group as a substituent. Additionally, k and l each independently represents an integer ranging from 1 to 3. Typically, k and l each independently is selected such that k+l equals 4. Additionally, $R^1$ can be —SO—$(CH_2)_3$—$SO_3Z$ or —$SO_2$—$(CH2)_3$—$SO_3Z$; and/or $R^2$ can be —$SO_2$—$(CH_2)_3$—$SO_2NH$—$C_2H_4OC_2H_4OH$ or —$SO_2$—$(CH_2)_3$—$SO_2NH$—$CH_2CH(OH)CH_3$. In these embodiments, Z can be lithium, sodium, potassium, ammonium, tetramethylammonium, or a mixture thereof. In yet another embodiment, Z can be lithium or potassium. In a further embodiment, Z can be lithium. In one specific embodiment, $R^1$ can be —$SO2$—$(CH2)_3$—$SO_3Z$, $R^2$ can be —$SO_2$—$(CH_2)_3$—$SO_2NH$—$CH_2CH(OH)CH_3$, k can be 3, and Z can be lithium.

The cyan ink can also include additional dyes or colorants. In one embodiment, the cyan ink further includes at least one additional dye, such as Direct Blue 199 (DB199), Direct Blue 86 (DB86), Direct Blue 87 (DB87), Direct Blue 307 (DB307), or Acid Blue 9 (AB9). In another embodiment, the cyan ink includes AB9, or the sodium or lithium salt of AB9. In another embodiment, the AB9 is added to the cyan ink in an amount of from about 0.01 to about 1 wt %, from about 0.05 to about 0.5 wt %, or from about 0.07 to about 0.4 wt %.

Table I below, provides exemplary phthalocyanine dyes in which the substituents $R^1$ and $R^2$ are each introduced at the β-position. However, it should be appreciated by those skilled in the art, that although one exemplary dye has the R substituent at the β-position, the dye and the ink containing the same can further include the same basic nucleus with the R substituent at different positions such as the α-position. In the exemplary dyes shown in Table I, M is copper (Cu).

TABLE I

| Cyan Dye | $R_1$ | k | $R_2$ | l |
|---|---|---|---|---|
| C1 | —SO—$(CH_2)_3$—$SO_3K$ | 3 | —$SO_2$—$(CH_2)_3$—$SO_2NH$—$C_2H_4OC_2H_4OH$ | 1 |
| C2 | —$SO_2$—$(CH2)_3$—$SO_3K$ | 2 | —$SO_2$—$(CH_2)_3$—$SO_2NH$—$C_2H_4OC_2H_4OH$ | 2 |
| C3 | —$SO_2$—$(CH2)_3$—$SO_3Li$ | 3 | —$SO_2$—$(CH_2)_3$—$SO_2NH$—$CH_2CH(OH)CH_3$ | 1 |
| C4 | —$SO_2$—$(CH2)_3$—$SO_3Li$ | 2.7 | —$SO_2$—$(CH_2)_3$—$SO_2NH$—$CH_2CH(OH)CH_3$ | 1.3 |
| C5 | —$SO_2$—$(CH2)_3$—$SO_3Li$ | 2 | —$SO_2$—$(CH_2)_3$—$SO_2NH$—$CH_2CH(OH)CH_3$ | 2 |

A variety of salts can be used in the above embodiment in order to cause the pigment in a black ink to precipitate when the pigment contacts the salt on a media substrate. The precipitation can occur when a self-dispersing pigment in the black ink interacts with multivalent (inorganic or organic) salts present in at least one of the color (e.g., cyan, magenta, yellow) inks. In some embodiments, additional bleed control agents are included in an amount comprising up to about 5 wt % of the ink-jet ink composition. Suitable bleed control agents consist of calcium nitrate, calcium chloride, calcium acetate, magnesium nitrate, magnesium chloride, magnesium acetate, magnesium sulfate and combinations of any of those.

Yellow Inks. Still another type of colorant that can be used in an ink-jet ink includes least one azo yellow dye, one of which has the structure of Formula 4.

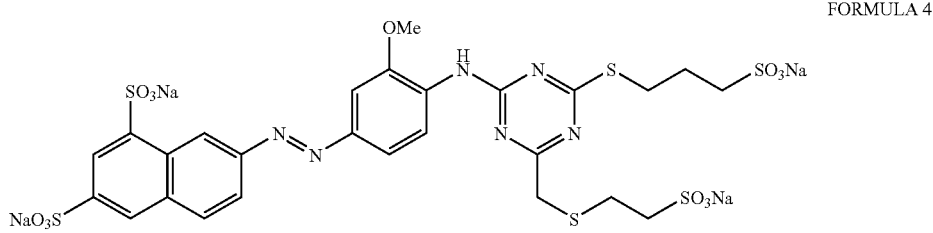

FORMULA 4

Anti-flocculant. Various of the new ink-jet inks further include an anti-flocculant material, such as a phenylenediamine compound having the structure of Formula 5.

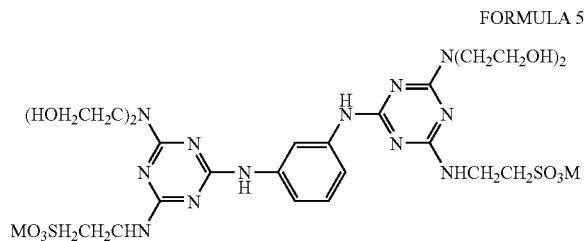

FORMULA 5

In Formula 5, above, this compound can be a salt where M is a monovalent cation, such as, but not limited to, lithium or sodium.

EXAMPLES

Examples of the new ink compositions are set forth below. These Examples are merely illustrative and are not intended to limit the claims in any way.

The ink-jet ink may be cyan, magenta, yellow, or any other color, depending on the colorant(s) selected. Each ink may include one or more colorant at independently selectable concentrations, hues, values, and chromas. The pHs of the inks are adjusted, as necessary with any of a wide variety of suitable pH adjustors such as potassium hydroxide or nitric acid, according to the specific pH requirements of the ink.

The dyes or other colorants in the inks of the present invention are present in amounts in the range of about 0.1 wt % to about 10 wt %. In some embodiments, they range from about 0.5 wt % to about 8 wt %, and in still other embodiments, the dyes or other colorants range from about 1 wt % to about 6 wt %, based on the total weight of the ink. It is noted that the amounts of dye(s) present in each of the inks is independent for each dye and for each ink. For example, a magenta dye might contain 3.5 wt % of Formula 1 and 2 wt % of Formula 2, or the cyan ink might have 4 wt % Formula 3). Dye Formulas 1-5 are described in more detail below.

The presence of an anti-flocculant phenylenediamine compound can act as an anti-flocculant, reducing unwanted aggregation of the dyes in the ink(s). In one embodiment, the phenylenediamine additive improves the quality of the printed images, in particular on swellable media, by reducing coalescence and bronzing of the ink on the printing medium. In some embodiments, a phenylenediamine compound is added to the ink in an amount generally ranging from about 0.2 to about 14 wt %, from about 1 wt % to about 13 wt %, or from about 1.5 to about 12 wt %, based on the total weight of the ink.

General Formulation Method.

As shown in FIG. 1, according to an exemplary method the above-mentioned components are combined to form an ink-jet ink by first adding (step 1) all of the ink vehicle components (including the 1,6-hexanediol and 1,5-pentanediol, and/or imidazole) and colorants to water and mixing. Additional water may then be added (step 2) to the components.

Once the ink formulation is formed, as described above, the pH of the ink formulation is then adjusted, if necessary, (step 3) to be in the range of approximately 5.5 to 8.5, by adding a pH adjustor such as potassium hydroxide or nitric acid according to the specific pH requirements of the ink. The remainder of the water is subsequently added (step 4).

The resulting ink-jet ink compositions can be placed into one or more ink-jet pens, as is known in the art. For example, the ink-jet ink may be incorporated into any type of ink-jet material dispenser including, but not limited to, thermally actuated ink-jet dispensers, mechanically actuated ink-jet, dispensers, electrostatically actuated ink-jet dispensers, magnetically actuated dispensers, piezoelectrically actuated dispensers, continuous ink-jet dispensers, and similar devices. Alternatively, the present ink-jet ink may be dispensed from non-ink-jet sources including, but not limited to, screen printing apparatus, stamping apparatus, pressing apparatus, gravure printing apparatus, and the like.

The following examples illustrate various aspects of the inks in accordance with embodiments of the present invention. These examples should not be considered as limitations of the invention, but should merely teach how to make inks representative of the present invention. In general, these exemplary formulas provide the following enhancements to the ink. When the ink comprises a mixture of 1,6-hexanediol and 1,5-pentanediol in a ratio in the range of 1:4 (wt/wt) to 4:1 (wt/wt) the following enhancements to the ink are potentially provided: improved print quality, increased decap time, pen reliability, environmental robustness of ink in pen, and environmental robustness of printed ink on media. When the ink comprises imidazole in the range of 0.1 to 6 wt % (by weight of the ink), the following enhancements to the ink are potentially provided: improved print quality, increased decap time, pen reliability, environmental robustness of ink in pen, environmental robustness of printed ink on media and aid in maintaining the pH of the ink in a desired range. When imidazole in the range of 0.1 to 6 wt % (by weight of the ink) and 1,6-hexanediol and 1,5-pentanediol in a ratio in the range of 1:4 (wt/wt) to 4:1 (wt/wt) the following enhancements to the ink are potentially provided improved print quality, increased decap time, pen reliability, environmental robustness of ink in pen, environmental robustness of printed ink on media and aid in maintaining the pH of the ink in a desired range.

Example I

Cyan A

An ink-jet ink is prepared according to Example I as follows:.

| Materials | Wt % |
| --- | --- |
| 1-(2-hydroxyethyl)-2-pyrrolidinone | 2.0-6.0% |
| 1-5 pentanediol | 2.0-7.0% |
| EHPD | 5.0-9.8% |
| 1,6-hexanediol | 0.5-4.0% |
| Imidazole | 0.1-1.0% |
| Surfactant | 0.1-3.0% |
| EDTA | 0.05-0.5% |
| Salt | 1.0-5.0% |
| Biocide | 0.01-0.3% |
| Cyan Dye of Formula 3 | 2.0-5.0% |
| Anti-flocculant of Formula 5 | 2.0-14.0% |
| Water | Balance |
| TOTAL | 100.00 |
| pH | 6.0-8.5 |

This ink contains 0.1-1.0% by total ink weight imidazole, hexanediol 0.5-4.0 wt %, and 2.0-7.0 wt % pentanediol, and one cyan dye (Formula 3). In this example, a combination of imidazole and Trizma can be used, as appropriate to maintain the desired pH. The anti-flocculant of Formula 5 can be used, as appropriate, in the range of 2.0-14 wt %.

Example II

Cyan B

Another ink-jet ink is prepared according to Example II as follows:

| Materials | Wt % |
| --- | --- |
| 2-pyrrolidinone | 2.0-6.0% |
| 1-5 pentanediol | 2.0-7.0% |
| EHPD | 5.0-9.8% |
| LEG-1 | 1.0-3.0% |
| 1,6-hexanediol | 0.5-4.0% |
| Imidazole | 0.1-2.0% |
| Surfactant | 0.1-3.0% |
| MOPS or MES | 0.05-0.5% |
| EDTA | 0.05-0.5% |
| Salt | 1.0-5.0% |
| Biocide | 0.01-0.3% |
| Cyan Dye of Formula 3 | 2.0-5.0% |
| Cyan Dye AB9 | 0.1-1.0% |
| Anti-flocculant of Formula 5 | 2.0-14.0% |
| Water | Balance |
| TOTAL | 100.00 |
| pH | 6.0-8.5 |

This ink contains 0.1-2.0% by total ink weight imidazole, 0.5-4.0 wt % 1,6-hexanediol, and 2.0-7.0 wt % 1,5-pentanediol, and cyan dye of formula 3 and a second cyan dye of formula AB9. The anti-flocculant of Formula 5 can be used, as appropriate, in the range of 2.0-14 wt %.

Example III

Magenta A

Another ink-jet ink is prepared according to Example III as follows:

| Materials | Wt % |
| --- | --- |
| 2-pyrrolidinone | 0-5.0% |
| 1-5 pentanediol | 3.0-8.0% |
| EHPD | 0-5.0% |
| 1,6-hexanediol | 5.0-15.0% |
| Surfactant | 0.1-3.0% |
| MOPS or MES | 0.05-1.0% |
| EDTA | 0.05-0.5% |
| Salt | 1.0-5.0% |
| Biocide | 0.01-0.3% |
| Magenta Dye of Formula 1 | 2.0-5.0% |
| Magenta Dye of Formula 2 | 0.5-2.5% |
| Anti-flocculant of Formula 5 | 0-14.0% |
| Water | Balance |
| TOTAL | 100.00 |
| pH | 7.0-7.5 |

This ink contains no imidazole, 0.05-1.0 wt % MOPS or MES as a buffer, 5.0-15 wt % 1,6-hexanediol, and 3.0-8.0 wt % 1,5-pentanediol, and magenta dye (Formula 1) 2.0-5.0 wt % and a second magenta dye (Formula 2) 0.5-2.5 wt %. This example optionally contains the anti-flocculant of Formula 5, as appropriate, in the range of 0-14 wt %.

Example IV

Magenta B

Another ink-jet ink is prepared according to Example IV as follows:

| Materials | Wt % |
| --- | --- |
| 2-pyrrolidinone | 2.0-6.0% |
| 1-5 pentanediol | 2.0-7.0% |
| EHPD | 5.0-9.8% |
| 1,6-hexanediol | 0.5-4.0% |
| Imidazole | 0.1-2.0% |
| Surfactant | 0.1-3.0% |
| EDTA | 0.05-0.5% |
| Salt | 1.0-5.0% |
| Biocide | 0.01-0.3% |
| Magenta Dye of Formula 1 | 2.0-5.0% |
| Magenta Dye of Formula 2 | 0.5-2.5% |
| Anti-flocculant of Formula 5 | 0-14.0% |
| Water | Balance |
| TOTAL | 100.00 |
| pH | 6.0-7.5 |

This ink contains 0.1-2.0 wt % imidazole, 0.5-4.0 wt % 1,6-hexanediol, and 2.0-7.0 wt % 1,5-pentanediol, and magenta dye (Formula 1) 2.0-5.0 wt % and a second magenta dye (Formula 2) 0.5-2.5 wt %. This example optionally contains the anti-flocculant of Formula 5, as appropriate, in the range of 0-14 wt %.

Example V

Yellow A

Another ink-jet ink is prepared according to Example V as follows:

| Materials | Wt % |
| --- | --- |
| 2-pyrrolidinone | 0.2-6.0% |
| 1-5 pentanediol | 2.0-7.0% |
| EHPD | 5.0-10.0% |
| 1,6-hexanediol | 0.5-4.0% |
| Surfactant | 0.1-3.0% |
| MOPS or MES | 0.05-1.0% |
| EDTA | 0.05-0.5% |
| Salt | 1.0-5.0% |
| Biocide | 0.01-0.3% |
| Yellow Dye of Formula 4 | 2.0-5.0% |
| Anti-flocculant of Formula 5 | 0-14.0% |
| Water | Balance |
| TOTAL | 100.00 |
| pH | 6.0-7.5 |

This ink contains no imidazole, 0.05-1.0 wt % MOPS or MES as a buffer, 0.5-4.0, wt % 1,6-hexanediol, and 2.0-7.0 wt % 1,5-pentanediol, and 0.02-5.0 wt % yellow dye (Formula 4). This example optionally contains the anti-flocculant of Formula 5, as appropriate, in the range of 0-14 wt %.

Example VI

Yellow B

Another ink-jet ink is prepared according to Example VI as follows:

| Materials | Wt % |
| --- | --- |
| 2-pyrrolidinone | 2.0-6.0% |
| 1-5 pentanediol | 2.0-7.0% |
| EHPD | 5.0-9.8% |
| 1,6-hexanediol | 0.5-4.0% |
| Imidazole | 2.0-6.0% |
| Surfactant | 0.1-3.0% |
| EDTA | 0.05-0.5% |
| Salt | 1.0-5.0% |
| Biocide | 0.01-0.3% |
| Yellow Dye of Formula 4 | 2.0-5.0% |
| Anti-flocculant of Formula 5 | 0-14.0% |
| Water | Balance |
| TOTAL | 100.00 |
| pH | 6.0-7.5 |

This ink contains 2.0-6.0 wt % imidazole, 0.5-4.0 wt % 1,6-hexanediol, 2.0-7.0 wt % 1,5-pentanediol, and 2.0-5.0 wt % yellow dye (Formula 4). This example optionally contains the anti-flocculant of Formula 5, as appropriate, in the range of 0-14 wt %

A number of ink performance improvements are observable with many formulations of ink containing imidazole and/or 1,6-hexanediol and 1,5-pentanediol, when they are employed for ink-jet printing, compared to many of the ink compositions in commercial use today. Various performance improvements include decreased red shift, and reduced stacked haze on porous photo media; decreased bronzing on swellable photo media; improved decap, nozzle health and pen recovery after storage. Still other improvements with many of the new ink formulations include greater ink stability during storage, and improved ASL, T-Cycle and Freeze/Thaw characteristics. Equivalent or improved bleed control was observed on plain paper media with many of these ink compositions, compared to many conventional ink-jet inks.

Process

Figure 2:
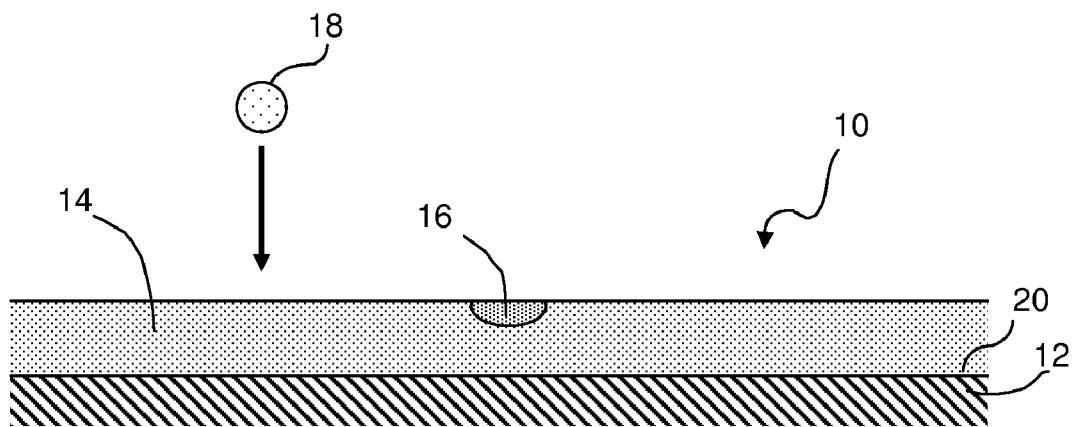
FIG. 2 is a schematic illustration of a printed medium comprising an imidazole-containing ink-jet ink, in accordance with an embodiment of the present invention.

Referring to FIG. 2, there is shown a representative print medium 10 comprising a substrate layer 12 having a surface 20 that is, optionally coated with a porous or swellable ink-receiving layer or coating 14. Substrate 12 can be paper, plastic, coated paper, fabric, art paper, optical disks, or another known substrate such as is used in the ink-jet printing arts. When it is desired to make a mark using an above-described ink, an ink droplet 18 is applied (e.g., via an ink-jet printer (not shown)) to layer 14, if present, or directly to the surface 20 of substrate 12, and is absorbed into layer 14 or substrate 12, leaving a mark, as at 16. The resulting printed product typically contains color marks containing a greater concentration of dye or pigment than a comparable product printed with most other ink-jet inks that are formulated with a greater amount of non-imidazole buffering agents. At the same time, products printed with most of the imidazole-and/or 1,6-hexanediol and 1,5-pentanediol-containing inks, buffered ink-jet ink compositions have the same or better qualities than many other ink-jet printed products that rely on greater quantities of conventional buffering agents. Some of the notable characteristics of many of the new ink-jet inks include equivalent or better control of black-to-color bleeding, a decrease in bronzing, a decrease in hazing and more satisfactory stacking performance. Improved print quality, increased decap time, pen reliability, environmental robustness of ink in pen, environmental robustness of printed ink on media, and aid in maintaining the pH of the ink in a desired range are all potentially provided by many of the inks disclosed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An ink for use in combination with an ink-jet printer, comprising a mixture comprising:
    a colorant;
    a liquid vehicle containing 5.0-7.0 wt % 1,6-hexanediol and 2.0-5.0 wt % 1,5-pentanediol, together providing 7.0-12.0 wt % of said mixture, in a ratio in the range of 1:1 (wt/wt) to 3:1 (wt/wt);
    at least one multivalent salt dissolved in said vehicle in a total amount of from about 1.0 wt % to about 5 wt % by weight of the ink; and
    an amount of imidazole in the range of about 0.5-2.5 wt % of the ink, the mixture providing at least one of the following enhancements to said ink: improved print quality, increased decap time, pen reliability, environmental robustness of ink in pen, environmental robustness of printed ink on media, and aid in maintaining the pH of the ink in a desired range.

2. An ink for use in combination with an ink-jet printer, comprising a mixture comprising:

a colorant;

a liquid vehicle comprising 1,6-hexanediol and 1,5-pentanediol in a ratio in the range of 1:4 (wt/wt) to 4:1 (wt/wt); and an amount of imidazole, in the range of about 0.1 wt % -6 wt % of the ink, the mixture providing one or more of the following enhancements to the ink: improved print quality, increased decap time, pen reliability, environmental robustness of ink in pen, environmental robustness of printed ink on media, and aid in maintaining the pH of the ink in a desired range.

3. The ink according to claim 2, wherein said mixture comprises: 5-15 wt % 1,6-hexanediol and 3-8 wt % 1,5-pentanediol.

4. The ink according to claim 1 wherein said colorant comprises:

(a) a magenta dye having the structure:

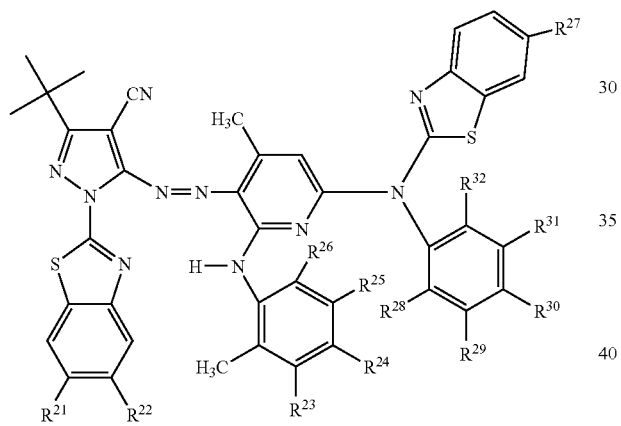

and salts thereof, wherein $R^{21}$, $R^{23}$, $R^{25}$, $R^{27}$, $R^{29}$ and $R^{31}$, are independently a hydrogen atom or a sulfonate group;

$R^{22}$ is a hydrogen atom or a nitro group;

$R^{26}$ and $R^{28}$ are independently a hydrogen atom or a methyl group;

$R^{24}$ and $R^{30}$ are independently a methyl or sulfonate group; and $R^{32}$ is a methyl or a methoxy group; and (b) a second magenta dye having the structure:

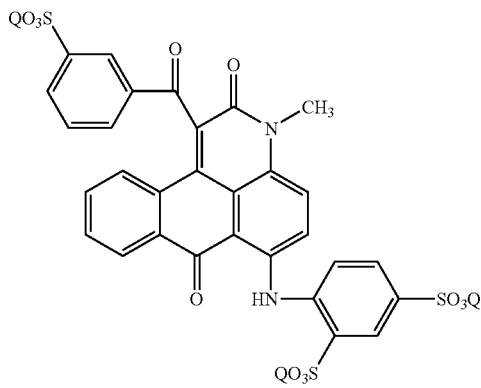

and salts thereof, wherein Q is lithium, potassium, sodium, ammonium, tetramethylammonium, or a mixture thereof.

5. The ink of claim 1, wherein said colorant comprises a cyan dye having the structure:

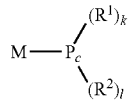

wherein

M is a hydrogen atom; a metal atom; or an oxide, hydroxide, or halide of the metal atom;

$P_c$ is a phthalocyanine nucleus;

$R^1$ and $R^2$ are independently a substituent selected from the group consisting of —$SOX^1$, —$SO_2X^1$, $SO_2NX^2X^3$, —$SO_3X^4$; where $X^1$, $X^2$, $X^3$, and $X^4$ are independently a hydrogen atom, a substituted or unsubstituted $C_1$ to $C_7$ alkyl group, a substituted or unsubstituted aryl group, or a substituted or unsubstituted heterocyclic group; wherein at least one of $R^1$ or $R^2$ has an ionic hydrophilic group as a substituent; and k and l are independently an integer ranging from 1 to 3, where the sum of k and l is 4.

6. The ink of claim 5, wherein, with respect to the cyan dye:
$R^1$ is —SO—$(CH_2)_3$—$SO_3Z$, or —$SO_2$—$(CH_2)_3$—$SO_3Z$;
$R^2$ is —$SO_2$—$(CH_2)_3$—$SO_2NH$—$C_2H_4OC_2H_4OH$, or —$SO_2$—$(CH_2)_3$—$SO_2NH$—$CH_2CH(OH)CH_3$;
k is from 2 to 3; and
Z is lithium, sodium, potassium, ammonium, tetramethylammonium, or a mixture thereof.

7. The ink of claim 5, wherein, with respect to the cyan dye:
$R^1$ is —$SO_2$—$(CH_2)_3$—$SO_3Z$;
$R^2$ is —$SO_2$—$(CH_2)_3$—$SO_2NH$—$CH_2CH(OH)CH_3$;
k is 3; and
Z is lithium.

8. The ink according to claim 1 wherein said colorant comprises a yellow dye having the structure:

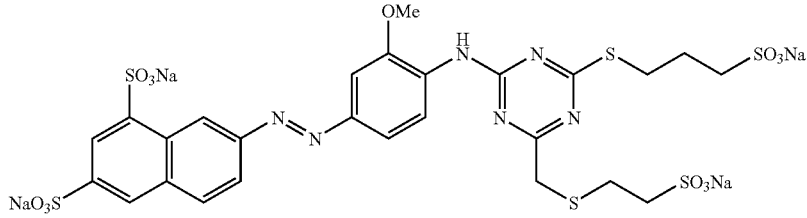

9. The ink according to claim 1 further comprises a phenylenediamine compound having the structure:

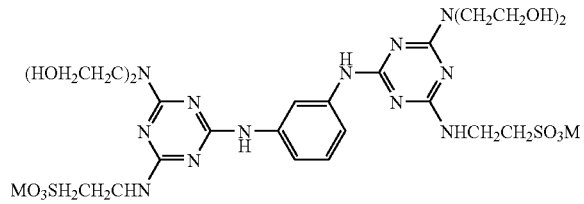

and salts thereof, wherein M is a monovalent cation.

10. The ink according to claim 2 wherein said colorant comprises:

(a) a magenta dye having the structure:

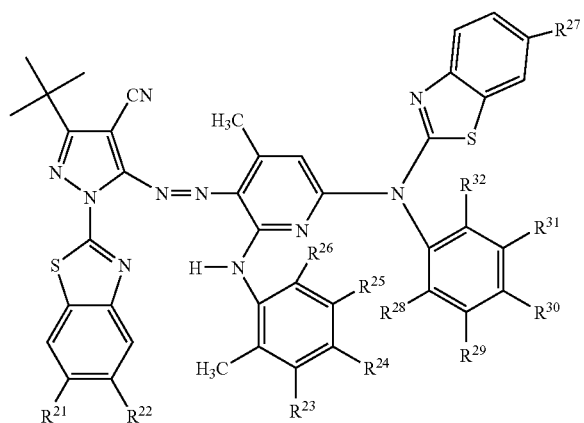

and salts thereof, wherein
$R^{21}$, $R^{23}$, $R^{25}$, $R^{27}$, $R^{29}$ and $R^{31}$, are independently a hydrogen atom or a sulfonate group;
$R^{22}$ is a hydrogen atom or a nitro group;
$R^{26}$ and $R^{28}$ are independently a hydrogen atom or a methyl group;
$R^{24}$ and $R^{30}$ are independently a methyl or sulfonate group; and
$R^{32}$ is a methyl or a methoxy group; and (b) a second magenta dye having the structure:

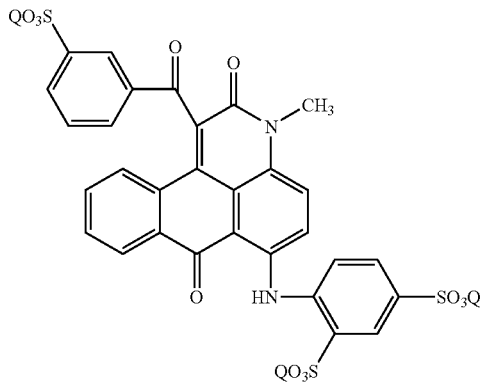

and salts thereof, wherein Q is lithium, potassium, sodium, ammonium, tetramethylammonium, or a mixture thereof.

11. The ink of claim 2, wherein said colorant comprises a cyan dye having the structure:

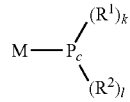

wherein
M is a hydrogen atom; a metal atom; or an oxide, hydroxide, or halide of the metal atom;
$P_c$ is a phthalocyanine nucleus;
$R^1$ and $R^2$ are independently a substituent selected from the group consisting of —$SOX^1$, —$SO_2X^1$, $SO_2NX^2X^3$, —$SO_3X^4$; where $X^1$, $X^2$, $X^3$, and $X^4$ are independently a hydrogen atom, a substituted or unsubstituted $C_1$ to $C_7$ alkyl group, a substituted or unsubstituted aryl group, or a substituted or unsubstituted heterocyclic group; wherein at least one of $R^1$ or $R^2$ has an ionic hydrophilic group as a substituent; and
k and l are independently an integer ranging from 1 to 3, where the sum of k and l is 4.

12. The ink of claim 11, wherein, with respect to the cyan dye:
$R^1$ is —SO—$(CH_2)_3$—$SO_3Z$, or —$SO_2$—$(CH_2)_3$-$SO_3Z$;
$R^2$ is —$SO_2$—$(CH_2)_3$—$SO_2NH$—$C_2H_4OC_2H_4OH$, or —$SO_2$—$(CH_2)_3$—$SO_2NH$—$CH_2CH(OH)CH_3$;
k is from 2 to 3; and
Z is lithium, sodium, potassium, ammonium, tetramethylammonium, or a mixture thereof.

13. The ink of claim 11, wherein, with respect to the cyan dye:
$R^1$ is —$SO_2$—$(CH_2)_3$—$SO_3Z$;
$R^2$ is —$SO_2$—$(CH_2)_3$—$SO_2NH$—$CH_2CH(OH)CH_3$;
k is 3; and
Z is lithium.

14. The ink according to claim 2 wherein said colorant comprises a yellow dye having the structure:

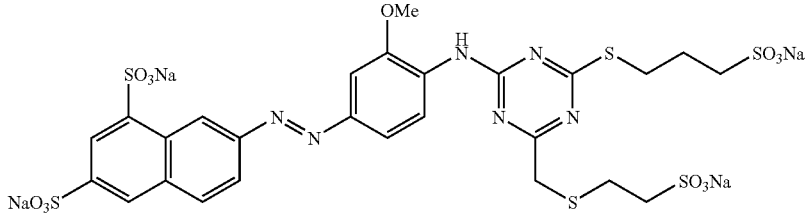

15. The ink according to claim 2 further comprises a phenylenediamine compound having the structure:

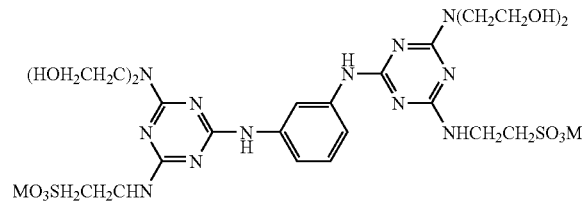

and salts thereof, wherein M is a monovalent cation.

16. The ink according to claim 1 wherein the amount of imidazole is in the range of about 0.5 to 2 wt %.

17. The ink according to claim 2 comprising at least one multivalent salt dissolved in said vehicle in a total amount of from about 1.0 wt % to about 5 wt % by weight of the ink.

18. A method of improving print quality of an ink-jet printed medium, comprising applying to a swellable medium, porous medium or plain paper medium, by way of an ink-jet printer, the ink according to claim 1, to enhance at least one quality selected from the group consisting of bronzing reduction, humid hue shift reduction, bleeding reduction, and environmental robustness in the resulting ink-jet ink printed medium.

19. A method of improving print quality of an ink-jet printed medium, comprising applying to a swellable medium, porous medium or plain paper medium, by way of an ink-jet printer, the ink according to claim 2, to enhance at least one quality selected from the group consisting of bronzing reduction, humid hue shift reduction, bleeding reduction, and environmental robustness in the resulting ink-jet ink printed medium.

20. A method of increasing pen reliability or decap time in an ink-jet printer, comprising employing the ink according to claim 1 in said ink-jet printer.

21. A method of increasing pen reliability or decap time in an ink-jet printer, comprising employing the ink according to claim 2 in said ink-jet printer.

22. A printed product comprising an ink-jet ink-receptive medium on which the ink of claim 1 has been deposited by an ink-jet printer.

23. A printed product comprising an ink-jet ink-receptive medium on which the ink of claim 2 has been deposited by an ink-jet printer.

24. The ink according to claim 2, wherein the amount of imidazole is in the range of about 0.5 to 2 wt%.

25. The ink according to claim 2, wherein the 1,6-hexanediol and the 1,5-pentanediol together comprise 8 to 25 wt % of said mixture.

26. The ink according to claim 2, wherein the 1,6-hexanediol and 1,5-pentanediol are in a ratio in the range of 1:4 (wt/wt) to 2:3 (wt/wt).

* * * * *

UNITED STATES PATENT AND TRADEMARK OFFICE
CERTIFICATE OF CORRECTION

PATENT NO. : 7,632,344 B2  Page 1 of 2
APPLICATION NO. : 11/669889
DATED : December 15, 2009
INVENTOR(S) : Marlene McGorrin It is certified that error appears in the above-identified patent and that said Letters Patent is hereby corrected as shown below:

In column 18, line 58, in Claim 1, delete "rang" and insert -- range --, therefor.

In column 19, line 20, in Claim 3, delete "comprises:" and insert -- comprises --, therefor.

In column 19, line 47, in Claim 4, delete "$R^{29}$" and insert -- $R^{29}$, --, therefor.

In column 20, line 40, in Claim 5, delete "I" and insert -- 1 --, therefor.

In column 20, line 41, in Claim 5, delete "I" and insert -- 1 --, therefor.

In columns 19-20, lines 57-67, in Claim 8, after

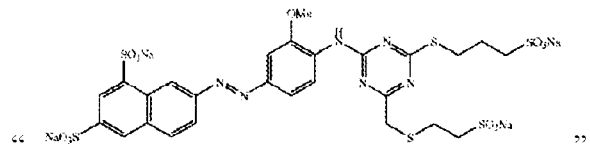

insert -- . --.

In column 21, line 48, in Claim 10, delete "$R^{29}$" and insert -- $R^{29}$, --, therefor.

In column 22, line 40, in Claim 11, delete "I" and insert -- 1 --, therefor.

In column 22, line 41, in Claim 11, delete "I" and insert -- 1 --, therefor.

Signed and Sealed this

Twenty-second Day of June, 2010

David J. Kappos
*Director of the United States Patent and Trademark Office*

CERTIFICATE OF CORRECTION (continued)
U.S. Pat. No. 7,632,344 B2

In column 22, line 43, in Claim 12, delete "–$SO_2$–$(CH_2)_3$-$SO_3Z$;" and insert -- –$SO_2$–$(CH_2)_3$–$SO_3Z$; --, therefor.

In columns 21-22, lines 57-67, in Claim 14, after

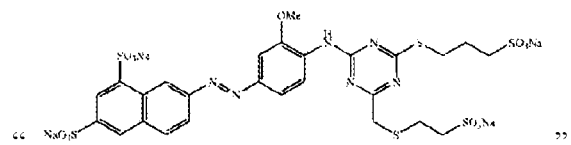

insert -- . --.